Dec. 2, 1952　　　　　G. E. ROWE　　　　　2,619,774
SETTLE BLOWHEAD AND BAFFLE
Filed Feb. 10, 1950　　　　　　　　　　　2 SHEETS—SHEET 1
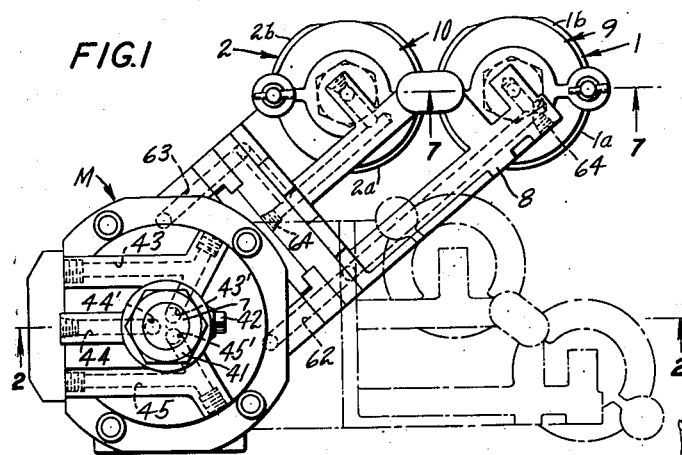
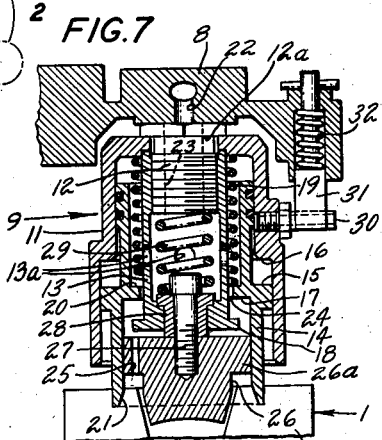
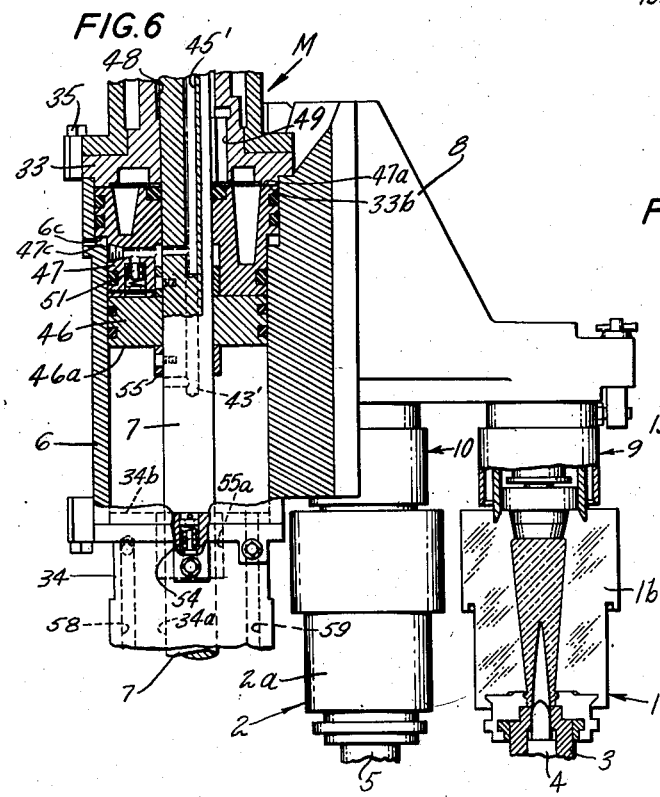
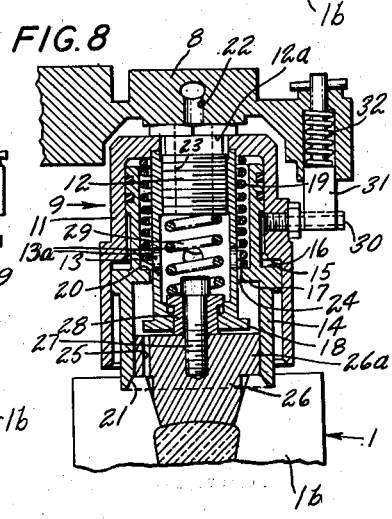
INVENTOR
GEORGE E. ROWE
BY Parham & Bates
ATTORNEYS Dec. 2, 1952  G. E. ROWE  2,619,774
SETTLE BLOWHEAD AND BAFFLE
Filed Feb. 10, 1950  2 SHEETS—SHEET 2
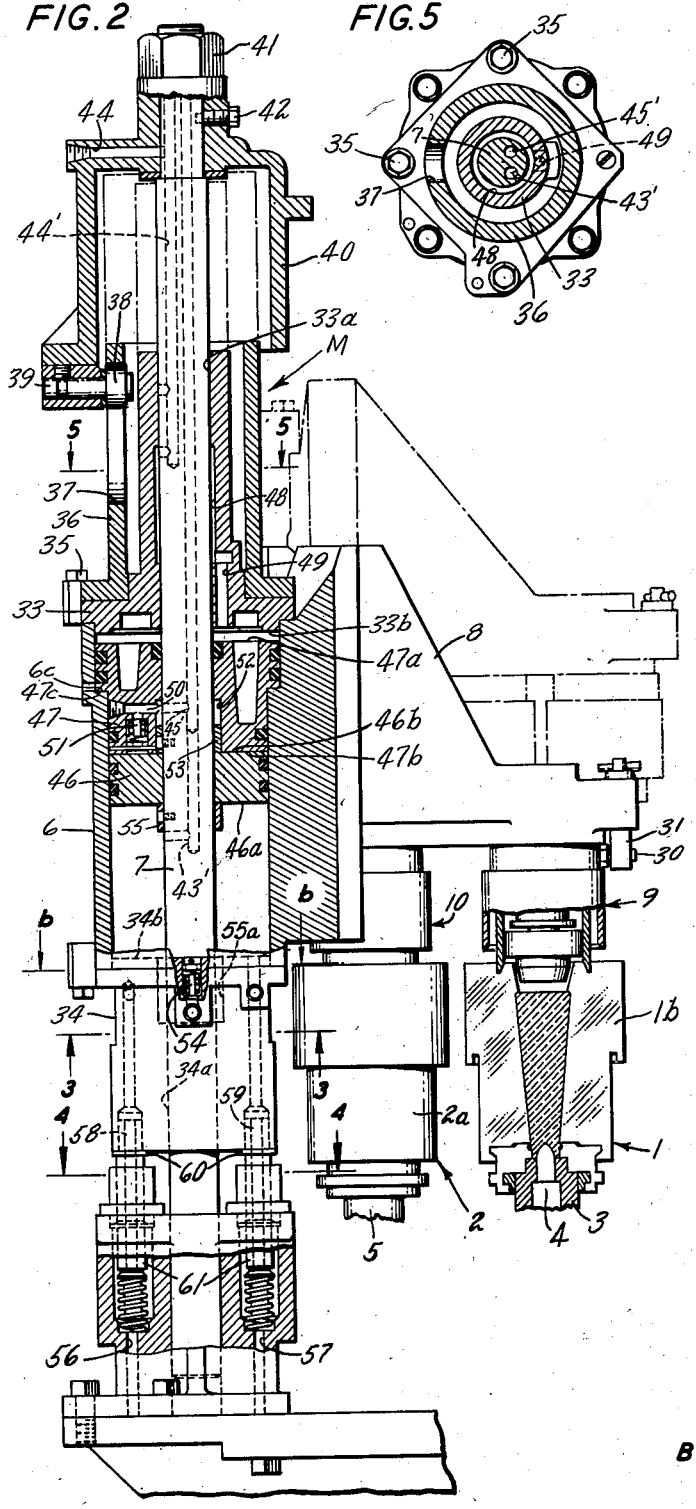
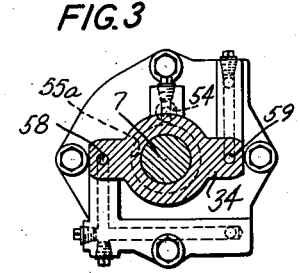
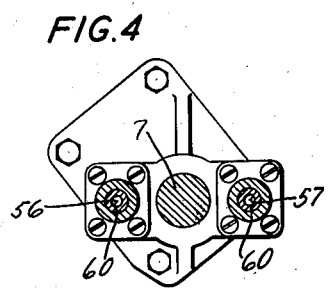
INVENTOR
GEORGE E. ROWE
BY Parham & Bates
ATTORNEYS Patented Dec. 2, 1952

2,619,774

UNITED STATES PATENT OFFICE 2,619,774

SETTLE BLOWHEAD AND BAFFLE

George E. Rowe, Wethersfield, Conn., assignor to Emhart Manufacturing Company, a corporation of Delaware Application February 10, 1950, Serial No. 143,386

6 Claims. (Cl. 49—18)

The present invention relates to the manufacture of glassware and has particular reference to the production of blown glassware by forming machinery in which glass charges or gobs are deposited in blank molds and there blown into parisons or preforms which are subsequently transferred to finishing molds where they are blown into final shape.

Generally the glass charges are smaller than the capacity of the blank molds and are fed downwardly into the open upper ends of the inverted blank molds with which are associated suitable neck ring molds and neck pins for molding the neck or finish of the parisons. Settle blowing pressure is supplied through the upper ends of the blank molds by blow heads to pack or settle the charges in their respective neck ring and blank molds and around the neck pins to form the finished neck portion of each preform or parison. Subsequently, the upper open ends of the blank molds are closed by baffle plates and counterblowing pressure is supplied to the recesses formed by the neck pins to expand the charges into conformity with the internal cavities of the blank molds and against the baffle plates.

A principal object of the present invention is to provide an improved settle blow and baffle plate device including improved positioning and operating mechanism having advantages over those heretofore known and employed for effecting the settle blowing and baffling operations.

A further object is to provide an improved device of the type described for positioning and operating a plurality of the settle blow and baffle heads simultaneously with respect to the molds of a double or plural gob forming machine.

Other objects and advantages of the invention will be apparent from the following description in which reference is made to the preferred embodiment of the invention illustrated in the accompanying drawings, in which:

Fgure 1 is a top plan view of a double gobbing settle blow and baffle head assembly and operating mechanism embodying the invention and showing the two settle-blow and baffle heads in their operative positions and also in their inoperative positions in phantom;

Fig. 2 is a front elevational view of the apparatus partially in cross-section as viewed from line 2—2 of Fig. 1, and with a portion of one of the blow heads broken away and a section of the associated two-section blank mold removed. For clarity of illustration, the portion of the operating mechanism below line b has been rotated approximately 45° about its vertical center line into the plane of the paper;

Figs. 3 and 4 are cross-sectional views taken on lines 3—3 and 4—4, respectively, of Fig. 2, it being here explained that the positions of the structure there shown will, in the actual apparatus, preferably be positioned at points corresponding to the rotation of the Figs. 3 and 4, approximately 45° in a counterclockwise direction about the axis of the center shaft shown in cross section;

Fig. 5 is a cross-sectional view taken on line 5—5 of Fig. 2;

Fig. 6 is a view similar to the central portion of Fig. 2 with the movable settle blows heads shown further vertically depressed relative to the vertical center shaft and operating piston;

Fig. 7 is an enlarged cross-sectional view of the outer baffle and settle blow head taken on line 7—7 of Fig. 1 and with the head in the settle-blowing position shown in Fig. 2; and Fig. 8 is a view similar to Fig. 7 showing the head in the baffle-closed position corresponding to the position of the operating mechanism as shown in Fig. 6.

Referring to the drawings, there is shown a pair of two-section molds 1 and 2 having sections 1a, 1b and 2a, 2b, such as are generally employed in glassware forming machines of the type to which the present invention relates, as for example the well-known "Hartford I. S. Machine" or the "Hartford 65 Machine," portions of which are illustrated and described in the copending patent applications, Serial Numbers 103,903 and 144,420 respectively, filed July 9, 1949, and February 16, 1950, by George E. Rowe.

As shown in Figs. 2 and 6, associated with the mold 1 is a two-section neck ring mold 3 and a neck pin 4. A like neck ring mold 5 and neck pin (not shown) similarly are associated with the blank mold 2. The blank molds and their associated neck ring molds and neck pins are supported and operated by suitable mechanisms such as those disclosed in the first of the aforesaid Rowe applications.

In accordance with the present invention, there is provided a settle blowing and baffle plate mechanism generally designated M and including a stationary vertical supporting post 7 on which is reciprocally mounted a housing cylinder 6 having a projecting arm portion or carrier 8 on the outer end of which are secured a pair of like settle blow and baffle heads 9 and 10. In order to perform the settle-blowing operation and to baffle the upper openings in the molds 1 and 2 during the counterblowing operation, the heads 9 and 10 may be moved into and out of engagement with the upper surfaces of the molds 1 and 2 by movement of cylinder 6 relative to the stationary shaft 7.

Referring more particularly to Figs. 7 and 8 for a description of the head 9, there is provided a generally cylindrical housing or adapter 11 which is open at its lower end and is secured at its upper end against shoulder 12a of a threaded stud 12 that projects vertically downward from the arm 8 through the top of and in axial alignment with the adapter which is secured on the stud 12 and against the stud shoulder 12a by a generally cylindrical plunger sleeve 13, the upper end of which is threaded on the stud 12. The stud itself may be secured to the arm 8 in any suitable manner, as by means of a bayonet connection (not shown) which provides for ready detachment and replacement. A pin 30 cooperates with a yoke member 31 which is slidably mounted in the arm 8 and prevents rotation of the adapter and disengagement of the connection between the stud 12 and its supporting arm 8. As shown in Figs. 7 and 8, the yoke member 31 is urged downwardly by a spring 32 and may be manually raised to permit ready detachment of the adapter.

Concentrically located between the housing 11 and sleeve 13 is a generally cylindrical holder 14 which is slidably mounted within the housing 11 and has an outer annular shoulder 15 which may engage a corresponding internal shoulder 16 of the adapter 11 and thereby limit the upward movement of the baffle holder 14 relative to the adapter. Similarly, an internal annular shoulder 17 is engageable with a corresponding flange portion 18 at the lower end of the plunger sleeve 13 for limiting the downward movement of the baffle holder 14. As shown in Figs. 7 and 8, the baffle holder 14 is continually urged towards its lowermost position by means of a compression spring 19 which is compressed between the top of the housing 11 and an annular rib 20 that projects inwardly from the baffle holder 14. The lower end of the baffle holder is beveled as at 21 as to enter a complementary annular groove in the top face of the mold 1 and provide a substantially air-tight seal to facilitate the settle blowing operation.

As hereinafter will be described in greater detail, settle blowing air may be supplied from a passageway 22 in the arm 8 through a connecting passageway 23 in the stud 12 into the interior of the plunger sleeve 13 and through sleeve holes 13a, openings 24 between the sleeve 13 and the baffle holder 14 and through hole 25 into the blow mold 1 to settle the glass charge in the mold 1, substantially as shown in Fig. 2. Suitable drill passages 25 or longitudinal surface grooves facilitate the flow of settle blowing air through the cylindrical flange portion 26a of a baffle 26, which is slidably supported by the baffle holder 14 and secured on the lower end of the plunger sleeve 13 by means of a bolt 27 and flange bushing 28. As will be apparent from an examination of Figs. 7 and 8, the baffle 26 and bushing 28 are permitted limited vertical movement relative to the plunger sleeve 13 and are continually urged toward their lowermost positions by a heavy compression spring 29 which bears on the bushing 28 and the lower end of the stud 12.

It will be seen that downward movement of the baffle heads from its position illustrated in Fig. 2 to its position shown in Fig. 6 forces the lower surface of the baffle flange 26a into engagement with the top surface of mold 1 and positions the baffle 26 in a conforming tapered recess in the upper end of the mold thereby providing a baffle against which to counterblow the glass charge to the position illustrated in Fig. 6.

The settle blow and baffle head 10 is identical in construction with the heretofore described head 9. Both heads are simultaneously moved into and out of their settle blowing and mold baffling positions by appropriate pivotal and vertical reciprocal movement of their common supporting baffle arm 8 which is secured to the housing 6. The latter is rotated and vertically reciprocated in the necessary manner relative to the concentric stationary shaft 7 by a mechanism which will now be described.

Referring more particularly to Fig. 2, the vertically reciprocable cylinder 6 of the operating mechanism M is secured between an elongated upper head member 33 and a lower head member 34 which have axially aligned bores 33a and 34a, respectively, which are slidably mounted on a shaft 7. Secured to the upper head 33 as by means of bolts 35 is an upwardly projecting cylindrical member 36 which is concentrically disposed about the shaft 7 and provided with a slotted camway 37. The camway 37 is arcuately shaped so that upon upward movement of the cylinder 6 the camway 37 will cooperate with a cam roller follower 38 to impart concurrent rotary movement to the cylinder 6 and corresponding pivotal movement to the arm 8 and thereby move the heads 9 and 10 between their operative positions (Fig. 1) and their inoperative positions (shown in phantom). It will be seen that the cam follower 38 is carried by a pin 39 which is secured to the lower end of a skirted cap bracket 40 which is readily secured to the upper end of the shaft 7 by nut 41 and lock screw 42.

Operating air for raising and lowering the housing 6 may be supplied from a timer (not shown) or a similar suitable regulable source of high pressure air through three separate lines 43, 44 and 45 which are located in the stationary bracket 40 and respectively communicate with drilled passages 43', 44' and 45' to extend downwardly and outwardly through shaft 7 at appropriate levels above and below a piston 46 rigidly secured to the shaft 7 and slidably engageable by the inner wall of the cylinder 6. A second piston 47 is slidably supported on the shaft 7 and within the cylinder 6 between the stationary piston 46 and the upper cylinder head 33. The piston 47 and cylinder 6 are correspondingly greater in diameter at their upper ends so that upper surface 47a of the piston 47 and the contiguous surface 33b of the cylinder head 33 have greater effective pressure surface areas than the lower surface 47b of the piston 47 and the contiguous pressure surface 46b of the stationary piston 46. The effective pressure surface areas of the latter are identical with the lower surface 46a of the stationary piston 46 and surface 34b of the lower cylinder head 34.

The passages 43, 44 and 45, respectively, supply operating air between the head 34 and the piston 46, between the piston 47 and the head 33 and between the pistons 46 and 47. The air from the passage 44 is led downwardly through an enlarged bore 48 and a connecting drill passageway 49 in the elongated head 33. Preferably, the air from passageway 45 travels through a laterally drilled and plugged passage 50 and a communicating vertically disposed spring-loaded check valve 51 which permits ready flow of air to the space between the pistons 46 and 47 to raise and swing the housing cylinder 6 to its inoperative position 4 shown in phantom in Fig. 1. However, the valve 51 checks the exhaust of air from between the pistons 46 and 47 and thereby snubs or cushions downward movement of the cylinder 6 to the operative position shown in Fig. 2.

In order that the snubbing or cushioning action of the check valve 51 will be effected only during the final downward movement of the cylinder 6, the piston 47 may be provided at its lower end with an enlarged bore 52 which establishes substantially unrestricted communication between the passage 45 and the space between the pistons except when the pistons are in close proximity, at which time a sleeve 53 secured to the shaft 7 substantially blocks flow of air through the enlarged bore 52 and acts with check valve 51 to snub the exhaust of air and cushion the final movement of the pistons into contact with one another (Fig. 2).

Similarly, there may be provided in the head 34 a like check valve 54 and enlarged bore 55a which cooperates in like manner with a sleeve 55 secured to the shaft 7 directly below the piston 46. Thus, air being exhausted from between the piston 46 and the head 34 through the passage 43', during upward movement of the baffle heads 9 and 10, is choked as the cylindrical housing 6 approaches its upper limit by the sleeve 55 and the check valve 54 so as to cushion the final movement of the housing to its uppermost position. However, flow of operating air to spread the piston 46 and head 34 and thereby initially lower the blow heads 9 and 10 toward their settle blowing position (Fig. 2) is substantially unchecked by the valve 54 and downward movement is not retarded until cushioned at the end of the stroke by the check valve 51 and sleeve 53.

During downward movement of the cylinder 6 to the settle-blowing position shown in Fig. 2, operating air is simultaneously supplied through lines 43 and 44 under the same pressure. However, the air from line 44 is applied over the greater effective piston area of surfaces 47a and 33b and acts to keep shoulder 47c of the floating piston 47 pressed downwardly against shoulder 6c of the cylinder 6 during downward movement of the cylinder thereby keeping each baffle 26 out of sealing engagement with its conforming blow mold recess in the molds 1 and 2 (Figs. 2 and 7) when the downward movement of the cylinder is arrested by the engagement of the floating piston 47 with the stationary piston 46 prior to and during the settle blowing operation.

Following the settle blowing operation, air pressure in line 44 is relieved while pressure is maintained in line 43 to further depress the housing 6 and draw the head 33 into engagement with the piston 47 substantially as shown in Fig. 6. The corresponding downward movement of the settle blow head results in the molds 1 and 2 forcing each baffle holder 14 upwardly into its adapter 11 and its baffle 26 is pressed into sealing engagement with its associated mold under the heavy compressive force of the baffle spring 29 whereupon the neck pin 4 may be withdrawn and the glass charge counter-blown to form a parison blank (Figs. 6 and 8).

The settle blowing air is supplied by the timer, or other regulating means (not shown) individually to the passages 22 of the respective blow heads 9 and 10 through parallel stand pipes 56 and 57 which are aligned respectively with passages 58 and 59 in the lower cylinder head 34.

As shown in Fig. 2, the lower ends of the passages 58 and 59 may each be provided with a nipple 60 which cooperates with a spring pressed bushing 61 in each of the stand pipes 56 and 57 so that when the cylindrical casing 6 is lowered to its settle blowing position the nipples 60 and bushings 61 will establish substantially leak-proof connections between the passages 58 and 59 and their respective stand pipes 56 and 57.

While for clarity the stand pipes 56 and 57 and their respective communicating passages 58 and 59 have been illustrated in Fig. 2 as being in the plane of the drawing, in actual practice it is preferable that the stand pipes and the aligned passages in the head 34 be disposed directly beneath and in alignment with the positions in which the passages 58 and 59 are illustrated in Fig. 1. In other words, it is preferable that the apparatus shown in Figs. 3 and 4 be rotated in a counterclockwise direction, approximately 45° about the axis of the shaft 7.

As is readily apparent in Fig. 1, settle blowing air from the passages 58 and 59 is supplied through their respective connecting passages 62 and 63 in the arm 8 to the settle blowing air inlets 22 of the respective blow heads 9 and 10. It will be understood that in most instances all of the aforementioned air passages may be drilled or otherwise conventionally formed and, where necessary, plugged with pipe plugs 64, substantially as shown in the drawings.

Having thus described the preferred embodiment of the invention, I claim:

1. In a mechanism of the character described, a carrier to which is secured a pair of vertically depending settle blowing adapter heads, a baffle holder mounted for vertical reciprocal movement within each of said heads and spring urged to lowermost positions relative to said heads, a pair of molds each of which is engageable by its holder and forms with its mold a communicating pressure chamber for confining settle-blowing air, a baffle disposed within and extending downwardly below each of said holders, said baffles being supported for limited vertical reciprocal movement relative to their respective holders and heads and spring urged to lower positions relative to said heads, a stationary piston, a cylinder vertically slidable on the stationary piston for raising and lowering said carrier, a movable piston within said cylinder and above said stationary piston, means for supplying pressure medium between said stationary and movable pistons to raise said cylinder and said movable piston relative to said stationary piston and disassociate said baffle holders from said molds, means for supplying pressure medium between said movable piston and said cylinder and for concurrently supplying pressure medium between said cylinder and said stationary piston to position said holder in settle-blowing engagement with said mold with said baffle spaced from said mold, said baffle being moved into counterblowing engagement with said mold by the pressure exerted between said cylinder and said stationary piston when the pressure exerted between said cylinder and said movable piston is relieved.

2. In a mechanism of the character described, a carrier having a substantially horizontal projecting arm to the other end of which is secured a plurality of vertically depending settle blowing adapter heads, a baffle holder mounted for vertical reciprocal movement within each of said heads and spring urged to lowermost positions relative to said heads, a plurality of individual molds respectively engageable by said holders and forming with said holders separate pressure chambers for confining settle-blowing air in each mold, a baffle disposed within and extending downwardly below each of said holders, each of said baffles being supported for limited vertical reciprocal movement relative to its respective holder and head and spring urged to lower position relative to said head, a stationary piston, a cylinder in said carrier vertically slidable on the stationary piston, a movable piston within said cylinder and above said stationary piston, said movable piston being engageable with said cylinder to limit the upper position of said carrier relative to said movable piston and being engageable by said cylinder and said stationary piston to limit downward movement of the carrier, said movable piston also being adapted to engage and move the cylinder upwardly upon upward movement of said movable piston, means for supplying pressure medium between said stationary and said movable pistons to raise said cylinder and said movable piston relative to said stationary piston and disassociate said baffle holders from their respective molds, means for supplying pressure medium between said movable piston and said cylinder to hold said carrier in its uppermost position relative to said movable piston and for concurrently supplying pressure medium between said cylinder and said stationary piston to position said holders in settle-blowing engagement with their respective molds with said baffles spaced from their respective molds, said baffles being movable into counterblowing engagement with their respective molds by said pressure exerted between the cylinder and said stationary piston when the pressure exerted between said cylinder and said movable piston is relieved whereby the carrier is moved downwardly relative to said movable piston.

3. In a mechanism of the character described, a vertically movable carrier having a substantially horizontal projecting arm to the outer end of which is secured a pair of vertically depending adapter heads, a cylindrical baffle holder mounted for vertical reciprocal movement within each of said supporting heads, the baffle holder of each being spring urged to a lowermost position relative to its associated head, a pair of molds respectively engageable by said holders, each holder forming with its associated mold a communicating pressure chamber for confining settle-blowing air, independently controllable means for supplying settle-blowing air individually to the pressure chamber of each mold, a baffle disposed within and extending downwardly below each of said holders, each baffle being supported for limited vertical reciprocal movement relative to its holder and head and spring urged to a lower position relative to said head, a stationary piston, a cylinder in said carrier vertically slidable on said stationary piston, a movable piston within said cylinder and above said stationary piston, means for supplying pressure medium between said stationary and said movable pistons to raise said cylinder and said movable piston relative to said stationary piston and disassociate said baffle holders from said molds, means for supplying pressure medium between said movable piston and said cylinder and for concurrently supplying pressure medium between said cylinder and said stationary piston to position said holders in settle-blowing engagement with said molds with said baffles spaced from said molds, said baffles being movable into counterblowing engagement with said molds by pressure exerted between said cylinder and said stationary piston when the pressure exerted between said cylinder and said movable piston is relieved.

4. In a mechanism of the character described, a carrier to which is secured a settle-blowing and baffle adapter head, a baffle holder mounted for reciprocal movement within said supporting head and spring urged to a lowermost position relative to said head, a mold engageable by said holder which forms with said mold a pressure chamber for confining settle-blowing air, a baffle disposed within and extending downwardly below said holder, said baffle being supported for limited vertical reciprocal movement relative to said holder and head and spring urged to a lower position relative to said head, a stationary piston, said carrier having a cylindrical bore and cylinder head portions operatively mounted on the stationary piston, a movable piston within said cylinder and above said stationary piston, adjacent ends of said two pistons having like surface areas and the extreme ends of said two pistons having dissimilar surface areas, said cylinder heads having dissimilar effective pressure surface areas, each of the two heads having a pressure area equal to that of the adjacent end of the nearest piston, means for supplying pressure medium between said stationary and said movable piston to raise said cylinder and said movable piston relative to said stationary piston and disassociate said baffle holder from said mold, means for supplying pressure medium between said movable piston and the adjacent cylinder head and for concurrently supplying pressure medium between said stationary piston and the adjacent cylinder head to position said holder in settle-blowing engagement with said mold with said baffle spaced from said mold, said baffle being movable into counter-blowing engagement with said mold by pressure exerted between said cylinder and said stationary piston when the pressure exerted between said cylinder and said movable piston is relieved.

5. In mechanism as recited in claim 4 and including an annular shoulder in said cylinder engageable with a corresponding shoulder portion of said movable piston for limiting movement of said cylinder relative to said movable piston when pressure medium is supplied between said cylinder and the movable piston.

6. In mechanism as recited in claim 5, a cam and follower for pivoting said carrier and swinging said baffle head out of alignment with said mold as the baffle head is moved away from said mold.

GEORGE E. ROWE.

REFERENCES CITED

The following references are of record in the file of this patent:

UNITED STATES PATENTS

| Number | Name | Date |
| --- | --- | --- |
| 1,197,837 | Loper et al. | Sept. 12, 1916 |
| 1,590,423 | Cramer | June 29, 1926 |
| 1,654,731 | Ingle | Jan. 3, 1928 |
| 1,945,983 | Rowe | Feb. 6, 1934 |
| 2,235,103 | Garwood | Mar. 18, 1941 |